United States Patent
Liu et al.

(10) Patent No.: US 9,399,181 B2
(45) Date of Patent: Jul. 26, 2016

(54) LIQUID-LIQUID-LIQUID THREE-PHASE CONTINUOUS COUNTERCURRENT EXTRACTION DEVICE AND USE THEREOF

(75) Inventors: Huizhou Liu, Beijing (CN); Kun Huang, Beijing (CN); Zhentao An, Beijing (CN)

(73) Assignee: INSTITUTE OF PROCESS ENGINEERING, CHINESE ACADEMY OF SCIENCES, Beijing (CN)

( * ) Notice: Subject to any disclaimer, the term of this patent is extended or adjusted under 35 U.S.C. 154(b) by 186 days.

(21) Appl. No.: 13/978,863

(22) PCT Filed: Apr. 11, 2011

(86) PCT No.: PCT/CN2011/000635
§ 371 (c)(1),
(2), (4) Date: Jul. 9, 2013

(87) PCT Pub. No.: WO2012/097480
PCT Pub. Date: Jul. 26, 2012

(65) Prior Publication Data
US 2013/0315803 A1    Nov. 28, 2013

(30) Foreign Application Priority Data
Jan. 19, 2011  (CN) .......................... 2011 1 0021141

(51) Int. Cl.
*B01D 11/04*  (2006.01)
*C02F 3/12*  (2006.01)

(52) U.S. Cl.
CPC ........ *B01D 11/0446* (2013.01); *B01D 11/0457* (2013.01); *C02F 3/121* (2013.01)

(58) Field of Classification Search
CPC ........... B01D 11/0457; B01D 21/0015; B01D 21/0033; B01D 21/0036; B01D 61/40; C07C 7/144; C02F 3/121
USPC ........ 423/22, 258, 70; 568/708; 210/201, 319
See application file for complete search history.

(56) References Cited

U.S. PATENT DOCUMENTS

| | | | | | |
|---|---|---|---|---|---|
| 3,362,791 | A | * | 1/1968 | Ryon | ............................ 422/112 |
| 3,997,445 | A | * | 12/1976 | Hannestad | .................... 210/319 |
| 4,439,405 | A | * | 3/1984 | Bailey | ................... B01D 11/04 423/10 |
| 4,898,672 | A | * | 2/1990 | Clifft | ....................... C02F 3/006 210/614 |
| 5,466,375 | A | * | 11/1995 | Galik | ................. B01D 11/0415 210/634 |
| 5,662,861 | A | * | 9/1997 | Taylor | ................ B01D 11/0457 266/170 |

(Continued)

FOREIGN PATENT DOCUMENTS

CN    200942305 Y  *  9/2007
CN    102302865 A  *  1/2012

*Primary Examiner* — Krishnan S Menon
*Assistant Examiner* — Waqaas Ali
(74) *Attorney, Agent, or Firm* — CBM Patent Consulting, LLC

(57) ABSTRACT

A liquid-liquid-liquid three-phase continuous and countercurrent extraction apparatus comprises a three-phase-mixing chamber, a three-liquid-flow settler, and a two-phase-mixing chamber; a liquid-flow control separator placed in the three-liquid-flow settler aims to flexibly regulate the directions of three liquid flows in the three-phase system by different control separator combinations to achieve either a countercurrent operation of the top-layered phase with the middle-bottom two-layered mixtures, or a countercurrent operation of the top-middle two-layered mixtures with the bottom-layered phase; and a method of using the same, relating to extraction and separation field of chemical technology.

1 Claim, 7 Drawing Sheets

(56) References Cited

U.S. PATENT DOCUMENTS 5,702,608 A * 12/1997 Foos ..................... G21C 19/46
                                                    210/608
5,772,887 A * 6/1998 Noah ....................... C02F 3/02
                                                    210/150
2004/0188334 A1* 9/2004 McWhirter ......... B01F 3/04609
                                                    210/219

* cited by examiner 1  three-phase-mixing chamber;

2  three-liquid-flow settler;

3  two-phase-mixing chamber;

⸺⸺⸺▸ The top phase (or the bottom phase);

⸺ ⸺ ⸺▸ The middle phase;

⸺⸺⸺▸ The bottom phase (or the top phase).

US 9,399,181 B2

LIQUID-LIQUID-LIQUID THREE-PHASE CONTINUOUS COUNTERCURRENT EXTRACTION DEVICE AND USE THEREOF

FIELD OF THE INVENTION

The present invention relates to extraction and separation field of chemical technology, and in particular, to an apparatus for liquid-liquid-liquid three-phase continuous and countercurrent extraction and the method of using the same, in order to realize three-phase extraction and simultaneous three-liquid-phase separation of multiple target components in complex systems.

BACKGROUND OF THE INVENTION

Extraction is an important chemical separation technique, possessing advantages such as high target selectivity, good adaptability to various materials, low energy consumption, easy to operate, and easy to achieve large-scale continuous production. Extraction can be widely used in chemical industry, metallurgy, new energy field, bio- and medical engineering, environmental engineering, natural product extraction, preparation of new materials and the efficient utilization of resources, etc., thus is known as "the most promising green chemical separation technology in $21^{st}$ century". With the separation objects and separation systems become increasingly complex, the traditional liquid-liquid two-phase extraction technique and the apparatus do not meet the requirement in emerging chemical separation system. Most of the structure designs of the extraction and separation apparatus in prior art aim at the liquid-liquid two-phase extraction process, and are divided into two types according to their mass transfer characteristics and phase separation process requirements, namely sequential contact and continuous contact extraction equipments, e.g. the mixer-settler extraction tank, the dial extraction tower, and the vibration sieve tower, etc. For some multi-component complex systems and easy emulsifying systems, disadvantages such as low selectivity, lengthy separation steps, and low separation efficiency lie in the traditional liquid-liquid two-phase extraction process, and disadvantages such as complex design of the flow direction and cascade structure, difficulties in effectively controlling of the interphase mass transfer and phase separation processes of the complex system, and high cost in operation and maintenance also lie in the apparatus. Taking biochemical system separation as an example, the cost in separation steps always constitutes more than 80% in the entire production costs. The serious lagging in separation apparatus development becomes the bottleneck problem that restricts the progress in our chemical process engineering field.

Liquid-liquid-liquid three-phase extraction is a newly emerged technique with high selectivity developed from microemulsion phase extraction technology to enhance mass transfer and separation based on the interface effect in the extraction process. Starting from the regulation of the micro-nano phase structural interface characteristics of the separation medium, one-step extraction and simultaneous three-phase separation or grouping separation of multiple target components in complex systems can be realized by controlling phase formation and separation behavior of three macroscopic co-existed liquid phases with different structures and properties. For separation of biochemical products such as penicillin, lincomycin, glutamic acid fermentation broth, the Chinese Patent ZL 00107655.8 provides a three-liquid-phase extraction system, consisting of an organic phase, a polymer phase, and a rich brine phase, to realize three-phase extraction and separation of different target extracts in the rich brine phase. The phase formation behavior in this new three-phase extraction system is easy to control comparing to other three-liquid-phase extraction system types, and the allocation behavior of different target extracts among the three macroscopic co-existed liquid phases can be effectively controlled by the phase formation behavior of the three-phase system. Applying this three-phase extraction technique to penicillin fermentation broth treating, target extraction, purification, and impurity removing process can be realized by one step, and intermediate steps such as demulsification, lyophilization and discoloration can be omitted and the process is simple. Due to high selectivity, the impurity and byproduct separation efficiency, the yield and purity of target product in three-phase extraction are significantly higher than that in traditional two-phase extraction technique. Currently, three-phase extraction separation in complex multi-component system becomes a hotspot and frontier topics in related fields internationally, and breakthroughs have been achieved in three-phase extraction basic theory and technique research. However, industrial applications of three-phase extraction new techniques are not achieved due to lack of industrial apparatus adapted to three-phase continuous extraction technique.

In order to take the advantages of liquid-liquid-liquid three-phase extraction technique for separation of complex multi-component systems, a series of three-phase extraction apparatus that meet the three-phase extraction technical features and process requirements have been developed. The Chinese Patent ZL 00107700.7 introduces a series-wound self-pumping multi-channel phase dispersion extraction apparatus, which is suitable for a three-phase extraction system consisting of an organic solvent and polymer-based aqueous two-phase extraction system. By using a self-pumping stirrer, effective control of mass transfer among any two of the three liquid phases and phase dispersion in the three-phase extraction system is realized for the first time, and emulsification in the extraction process can be effectively avoided. However, the extraction operation cannot be continuous and the device processing power is limited, not suitable for the industrial continuous production. The Chinese Patent ZL 02106742.2 provides a liquid-liquid-liquid three-phase continuous extraction vibration sieve tower. This apparatus resolves the problem about how to perform continuous extraction operations. However, the flow directions of the three flows in the three-phase system and the countercurrent operations of the three liquid phases cannot be effectively controlled due to the structure design of the tower separation device. In addition, the mass transfer efficiency and separation parameters are still low, the operating conditions are harsh, flooding and axial backmixing are easy to happen, and scaling-up process is difficult. In fact the apparatus is an integrator of two liquid-liquid two-phase extraction-tower units being connected together in series in order to realize contacting and mass transferring between any two phases of three-liquid-phase flow. The interphase mass transferring is not carried out in a manner of three-liquid-phase process, and the flow behaviors of the three liquid phases are not controllable. To solve the above problems, the Chinese Patent ZL 02121210.4 suggests a liquid-liquid-liquid three-phase horizontal continuous stirring extraction apparatus. This apparatus for the first time realizes the liquid-liquid-liquid three-phase continuous in-situ contact mass transfer, with advantages such as reduced backmixing, high theoretical stages, high extraction efficiency, simple structure, easy to scaling up, continuous operation, low energy consumption, low room occupation, and easy to retain steady state operation, suitable for the three-phase extraction and separation process of easy emulsified biochemical products. However, this apparatus cannot realize multi-stage continuous and countercurrent extraction operation, the three main phases cannot mix well, and the mass transfer happens only at the phase-to-phase contact surface, with low processability, complicated device structure and difficulties to scale up. Therefore, the Chinese Patent CN200910090899.X suggests also a liquid-liquid-liquid three-phase continuous extraction mixer-settler apparatus. This apparatus solves the problem of how to control the three flow directions in the three-phase extraction system, and multi-stage series-wound continuous extraction operations can be conducted. However, this apparatus does not design the device structure from the essential characteristics of the phase formation behavior in the three-phase extraction system. The extraction and separation operations are based on quick phase separation of the three liquid phases, and the countercurrent operation combinations of any two of the three liquid phases are not realized, thus the process requirement of controlling the mutual mass transfer and distribution among the three liquid phases in the three-phase extraction process are not satisfied. Deutsch Bayer Co. suggested a multi-stage three-phase extractor (Chinese Patent ZL 96197714.0) to meet the requirement of countercurrent and continuous operations of three-liquid-phase extraction process. However, a precondition for this apparatus design is the three liquid flows in the three-phase system can not be miscible during the course of phase-mixing and contacting. Two phases in the three-phase system are used as dispersion phase and the other phase is served as continuous phase to flow countercurrently. This apparatus solves the problem of co-current or countercurrent between the continuous phase and the first or second dispersion phase. However, for a three-phase system consisting of an organic phase, a polymer phase, and a rich brine phase, the phase formation behavior in the three-phase system is to form a aqueous two-phase extraction system by the polymer phase and the rich brine phase to transfer the target mass from the rich brine phase (the bottom phase) to the polymer phase (the middle phase), followed by the target mass transfer from the polymer phase (the middle phase) to the organic phase (the top phase) by mixing the aqueous two-phase extraction system with the organic phase. The prerequisite of the formation of a stable three-phase system is the phase formation of the aqueous two-phase system of polymer phase-rich brine phase. The mass transfer behavior in the three-phase system is closely related to the phase formation behavior. This apparatus cannot realize effective control of the phase formation behavior of the three-phase system consisting of an organic phase, a polymer phase, and a rich brine phase, as well as of the phase type of the dispersion and continuous phases.

SUMMARY OF THE INVENTION

The purpose of the present invention is to provide an industrial production adapted apparatus for liquid-liquid-liquid three-phase multi-stage continuous and countercurrent extraction operations to solve the problem of how to realize the mutual countercurrent operation combination among any two of the three liquid phases, and to satisfy the requirement of controlling the phase formation and mass transfer behaviors in the three-phase system to control the mass transfer and distribution behaviors of the target extract among any two of the three liquid phases. This apparatus comprises a three-phase-mixing chamber, a three-liquid-flow settler, and a two-phase-mixing chamber. A control separator to flexibly regulate the directions of three liquid flows in the three-phase system is placed in the three-liquid-flow settler to realize by different control separator combinations either a countercurrent operation of the top-layered phase with the middle-bottom two-layered mixtures, or a countercurrent operation of the top-middle two-layered mixtures with the bottom-layered phase. Mutual countercurrent and continuous operations among the top, the middle, and the bottom flows in the three-phase system can be realized by the multi-stage series-wound apparatus. The introduction of the control separator takes the structural advantages of the combination of the three-phase-mixing chamber and the two-phase-mixing chamber, meets the requirement of the phase formation behavior and interphase mass transfer control in the three-phase system, accords to technical characteristics in the three-phase extraction process, and realizes the continuous and countercurrent controllable operations of one-step extraction and simultaneous three-phase separation of multi-components in complex systems.

The apparatus of the present invention comprises a three-phase-mixing chamber, a three-liquid-flow settler, and a two-phase-mixing chamber.

The three-phase-mixing chamber 1 comprises a three-phase mixing compartment a, a three-phase overflow compartment b, and a three-phase conflux compartment c, where clap-boards are present between the three-phase mixing compartment a and the three-phase overflow compartment b, and between the three-phase mixing compartment a and the three-phase conflux compartment c. In the three-phase mixing compartment a, there is a self-pumping stirrer 6 connecting through a stirring shaft with a speed continuously adjustable stirring motor. Independent first liquid flow entrance 7 and second liquid flow entrance 8 are set at the lower parts of the two sides of the three-phase conflux compartment c, in which the first liquid flow entrance 7 is directly connected with the three-phase conflux compartment c, while the second liquid flow entrance 8 is connected through a pipe with the three-phase mixing compartment a. On the central of the clap-board between three-phase mixing compartment a and three-phase conflux compartment c, independent first diversion orifice 9 and second diversion orifice 10 are connected respectively with three-phase conflux compartment c and the second liquid flow entrance 8. On the side of three-phase overflow compartment b on the top of the three-phase-mixing chamber 1 and close to the three-liquid-flow settler 2, there is an overflow weir 11, connecting with the three-liquid-flow settler 2.

A vertical return-flow clap-board 12 parallel to the vertical clap-board of the three-phase-mixing chamber 1 is installed on the side of the three-liquid-flow settler 2 that is close to the overflow weir 11. Below the vertical return-flow clap-board, there is a horizontal clap-board 13 perpendicular to the vertical return-flow clap-board connecting to the vertical clap-board of the three-phase mixing chamber. Between the bottom of the vertical return-flow clap-board 12 and the horizontal clap-board 13 under the vertical return-flow clap-board 12, there is an interspace which allows the mixed liquids overflow from the three-phase overflow compartment b to pass through it. The function of the vertical return-flow clap-board 12 and the horizontal clap-board 13 is to decrease the flux of mixed liquids and promote the phase-separation of the mixed three liquid phases overflowed from the three-phase-mixing chamber 1.

On the side of the three-liquid-flow settler 2 that is close to the two-phase-mixing chamber 3, there is a three-phase liquid flow separator control compartment d in which two different types in need of pluggable three-phase liquid flow first control separator 4 or second control separator 5 can be installed and fastened by a localizer 14. The aim of first control separator 4 or second control separator 5 is to control the routes of three-layered liquid flows of the three-phase system and to achieve different combinations and separations of the top, the middle, and the bottom liquid flows in the three-phase system. There is a liquid flow exit 15 at the bottom of three-phase liquid flow separator control compartment d on the bottom side of the vertical clap-board of the three-liquid-flow settler 2, and there opened a rectangular liquid flow exit 16 on the side of the vertical clap-board of the two-phase-mixing chamber 3 close to the three-phase liquid flow separator control compartment d. The first control separator 4 is used when the lightest top phase of the three-phase liquid flows needs to be separated from the middle-bottom two-layered mixtures, and there opened a rectangular liquid flow exit 20 with the same height and width as that of the exit 16 on the side under the first control separator 4. The second control separator 5 is used when the heaviest bottom phase of the three-phase liquid flows needs to be separated from the top-middle phase, and there is no exit on the side of the second control separator 5. The height H of the second control separator 5 is half of the height L of the exit 16. When first control separator 4 is used, the top phase can be educed out from the liquid flow exit 15 at the bottom of the three-phase liquid flow separator control compartment d on the top of the first control separator 4, while the middle-bottom two-layered mixtures can pass through the liquid flow exit 16 on side of the vertical clap-board from the liquid flow exit 20 on the side under the first control separator 4 into the two-phase-mixing chamber 3. When second control separator 5 is used, the bottom phase can be educed out from the liquid flow exit 15 at the bottom of the three-phase liquid flow separator control compartment d under the second control separator 5, while the top-middle phase can pass through the liquid flow exit 16 on side of the vertical clap-board on the top of the second control separator 5 into the two-phase-mixing chamber 3.

In two-phase-mixing chamber 3 there is a stirrer 17 connecting through a stirring shaft with a speed continuously adjustable stirring motor. On the side of the two-phase-mixing chamber 3, there is an overflow weir 18. The height of the overflow weir 18 reaches at the middle of the two-phase-mixing chamber 3. Below the overflow weir 18 there is a liquid flow exit 19. The overflow weir 18 allows the two-phase mixtures in two-phase-mixing chamber 3 overflow during the mixing process and flow out from the liquid flow exit 19 at the bottom of the overflow weir 18.

On the side of the two-phase-mixing chamber 3 that is close to the three-phase liquid flow separator control compartment d in the three-liquid-flow settler 2, at the liquid flow exit 16 on side of the vertical clap-board of the two-phase-mixing chamber 3, there installed a return-flow clap-board 21 parallel to the vertical clap-board with the same width and length as that of the rectangular liquid flow exit 16. There is an interspace between the return-flow clap-board 21 and liquid flow exit 16, which allows the liquid pass across. The purpose of the interspace is: 1) to prevent the return-flow of the mixed liquids in the two-phase-mixing chamber 3 back to the three-liquid-flow settler 2 from the liquid flow exit 16 on side of the vertical clap-board; 2) to allow the liquid flow separated by first control separator 4 or second control separator 5 from the three-phase liquid flow separator control compartment d in the three-liquid-flow settler 2 to flow into the two-phase-mixing chamber 3.

The apparatus in present invention is cubic. Preferably, the length ratio of three-phase-mixing chamber 1, three-liquid-flow settler 2 and two-phase-mixing chamber 3 is 1:5:1. The volume ratio of three chambers is also 1:5:1 when their widths and heights are the same.

The apparatus of the present invention can be employed independently as one extraction stage in continuous multi-stage series-wound extraction operations. When single-stage continuous extraction operation is conducted, the two-phase mixture, which is flowed from the liquid flow exit 19 at the bottom of the overflow weir 18 in the two-phase-mixing chamber 3 of previous extraction-stage, flows through the first liquid flow entrance 7 connecting to the three-phase conflux compartment c into the three-phase conflux compartment c. The lightest top phase or the heaviest bottom phase of the three-phase system, which is flowed from the liquid flow exit 15 at the bottom of the three-phase liquid flow separator control compartment d in the three-liquid-flow settler 2 of previous extraction-stage, flows through the second liquid flow entrance 8 connecting to the three-phase mixing compartment a into the three-phase mixing compartment a. The liquid from the three-phase conflux compartment c and the liquid from the second liquid flow entrance 8 are drew into the three-phase mixing compartment a by the self-pumping stirrer 6 in the three-phase mixing compartment a from the first diversion orifice 9 and the second diversion orifice 10 to be mixed thoroughly. The mixtures stay in the three-phase mixing compartment a for a certain period of time, overflow from the overflow weir 11 on the side of the three-phase overflow compartment b on the top of the three-phase-mixing chamber 1 that is close to the three-liquid-flow settler 2, then overflow from the interspace between the bottom of the vertical return-flow clap-board 12 on the side of the three-liquid-flow settler 2 that is close to the overflow weir 11 and the horizontal clap-board 13 below into the three-liquid-flow settler 2. The mixtures divide gradually into three macroscopic co-existed liquid phases in the three-liquid-flow settler 2, due to their gravitational density differences. The three-phase liquids are separated by the first control separator 4 or the second control separator 5 when flowing through the three-phase liquid flow separator control compartment d on the side of the three-liquid-flow settler 2 that is close to the two-phase-mixing chamber 3. The first control separator 4 is used when the lightest top phase of the three-phase liquid flows needs to be separated from the middle-bottom two-layered mixtures, and the second control separator 5 is used when the heaviest bottom phase of the three-phase liquid flows needs to be separated from the top-middle phase. When the first control separator 4 is used, the top phase can be educed out from the liquid flow exit 15 at the bottom of the three-phase liquid flow separator control compartment d on the top of the first control separator 4, while the middle-bottom two-layered mixtures can pass through the liquid flow exit 16 on side of the vertical clap-board from the liquid flow exit 20 on the side under the first control separator 4 into the two-phase-mixing chamber 3. When the second control separator 5 is used, the bottom phase can be educed out from the liquid flow exit 15 at the bottom of the three-phase liquid flow separator control compartment d under the second control separator 5, while the top-middle phase can pass through the liquid flow exit 16 on side of the vertical clap-board on the top of the second control separator 5 into the two-phase-mixing chamber 3. The two-phase mixtures flow through the return-flow clap-board 21 on the side of the vertical clap-board of the two-phase-mixing chamber 3 into the two-phase-mixing chamber 3, mix further by the stirrer 17, then flow out from the liquid flow exit 19 on the overflow weir 18 on the side of the two-phase-mixing chamber 3.

The apparatus of the present invention can also be employed in multi-stage series-wound extraction operations. Under a multi-stage series-wound operation model, mutual contact mass transfer in a three-phase system consisting of an organic phase, a polymer phase, and a rich brine phase, of transferring between the polymer phase (the middle phase) and the rich brine phase (the bottom phase), or between the organic phase (the top phase) and the polymer phase (the middle phase), is finished in the two-phase-mixing chamber 3 of each stage, followed by mixing with the third liquid flow phase (organic phase for the former and rich brine phase for the latter) in the three-phase-mixing chamber 1 of the next stage.

The apparatus of the present invention has the following advantages:

1. A three-phase liquid flow separator control compartment d is set in the three-liquid-flow settler. Two different types of pluggable three-phase liquid flow separators in need can be installed to flexibly control the routes of three-layered liquid flows and to achieve different combinations and separations of any two of the top, the middle, and the bottom flows in the three-phase system.

2. It is not necessary to obtain a clear phase-separating of the three-layered liquid-flows in the three-liquid-flow settler. The phase separation of the lightest top phase of the three-phase system and the middle-bottom two-layered mixtures or of the heaviest bottom phase of the three-phase system and the top-middle phase, can be achieved by the three-phase liquid flow separator control compartment even when the phase interface between three-layered liquids are not clear.

3. The multi-stage series-wound of the apparatus of the present invention realizes the continuous controllable extraction operations of mutual countercurrent mass transfer of any two of the top, the middle, and the bottom flows in the three-phase system. Either a countercurrent operation of the middle-bottom two-layered mixtures with the top-layered phase, or a countercurrent operation of the top-middle two-layered mixtures with the bottom-layered phase in the three-phase system can be achieved by using different control separators.

4. The three-chamber combination structure of the apparatus of the present invention, which comprises a three-phase-mixing chamber, a three-liquid-flow settler, and a two-phase-mixing chamber, in combination with the control separators in the three-liquid-flow settler, meets the requirement of the phase formation behavior and interphase mass transfer control in the three-phase system, and accords to practical characteristics in the three-phase extraction process.

5. The apparatus of the present invention is structural concise, convenient to operate and control, good processability, easy to scale-up, and low maintenance and operation cost. It offers a feasible device solution for industrial large-scale applications of using one-step three-phase extraction to extract and separate multi-target in complex system.

DETAILED DESCRIPTION OF THE PREFERRED EMBODIMENTS

Figure 1:
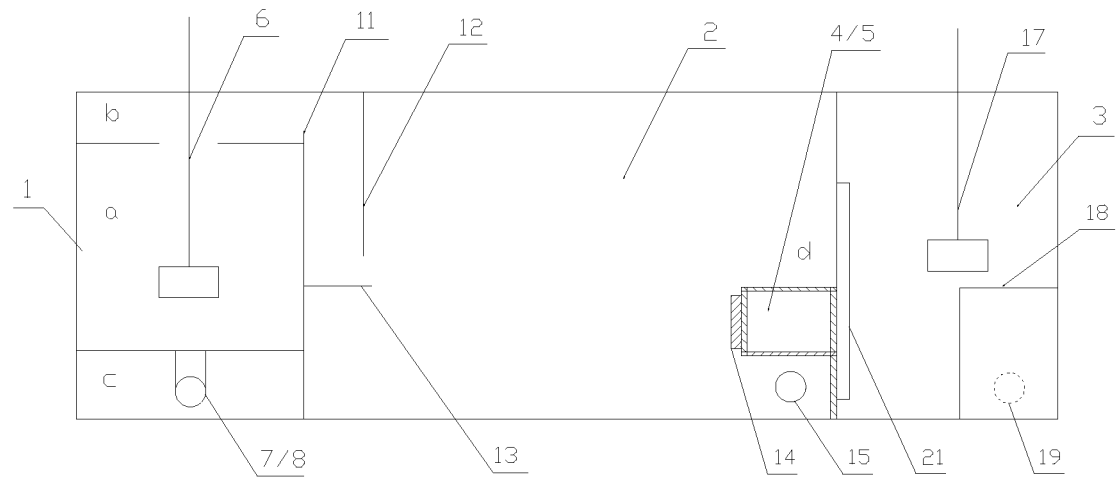
FIG. 1 is the main-view of the apparatus of the present invention, including three-phase-mixing chamber 1, three-liquid-flow settler 2, two-phase-mixing chamber 3, first control separator 4/second control separator 5, self-pumping stirrer 6, first liquid flow entrance 7, second liquid flow entrance 8, overflowing weir 11, vertical return-flow clap-board 12, horizontal clap-board 13, three-phase liquid flow control separator localizer 14, liquid flow exit 15, stirrer 17, overflow weir 18, liquid-flow exit 19, and return-flow clap-board 21, in which a is a three-phase mixing compartment, b is a three-phase overflow compartment, c is a three-phase conflux compartment, and d is a three-phase liquid flow separator control compartment.
Figure 2:
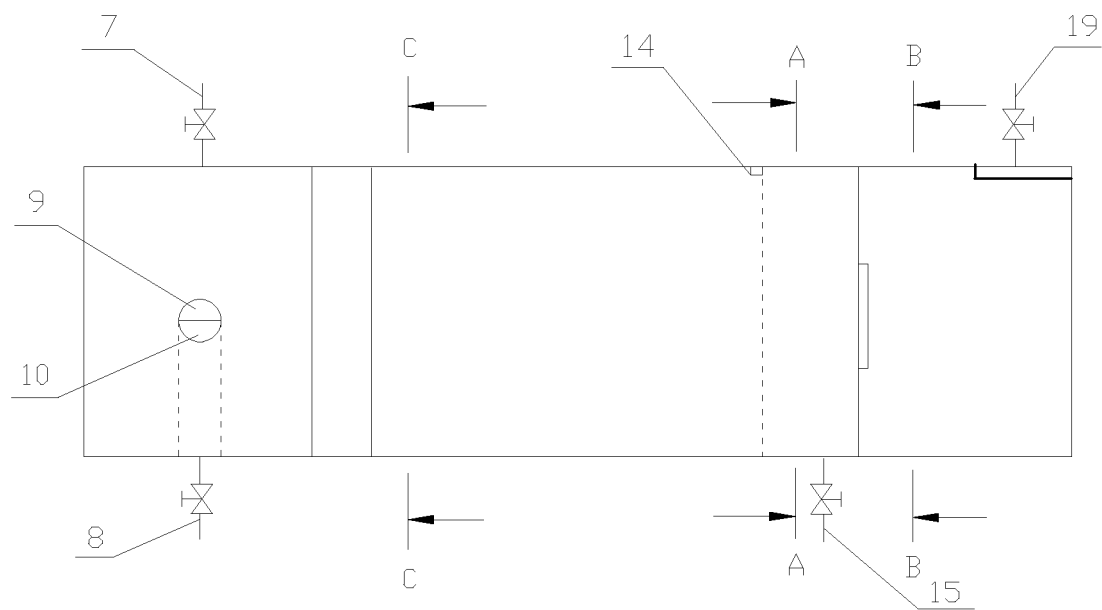
FIG. 2 is the top-view of the apparatus of the present invention including first liquid flow entrance 7, second liquid flow entrance 8, first diversion orifice 9, second diversion orifice 10, three-phase liquid flow control separator localizer 14, liquid flow exit 15, and liquid flow exit 19.
Figure 3:
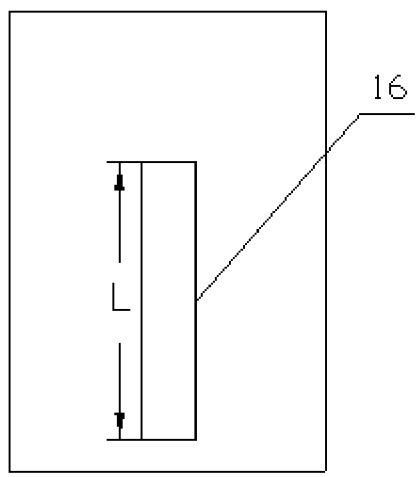
FIG. 3 is the cutaway-view of the A-A side viewing from the left, in which L is the height of the liquid flow exit 16.
Figure 4:
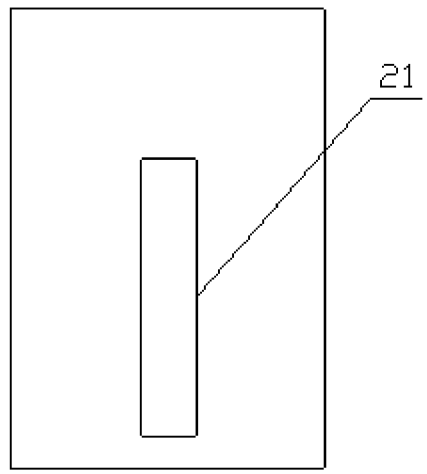
FIG. 4 is the cutaway-view of the B-B side viewing from the right, in which 21 is a return-flow clap-board.
Figure 5:
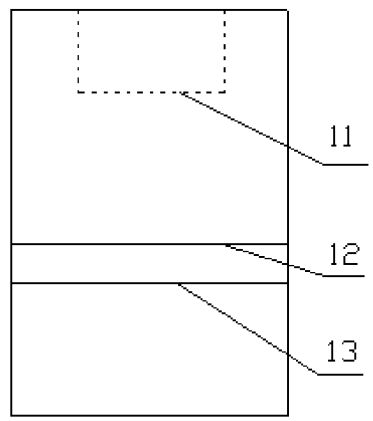
FIG. 5 is the cutaway-view of the C-C side viewing from the right, in which 11 is an overflow weir, 12 is a vertical return-flow clap-board, and 13 is a horizontal clap-board.
Figure 6:
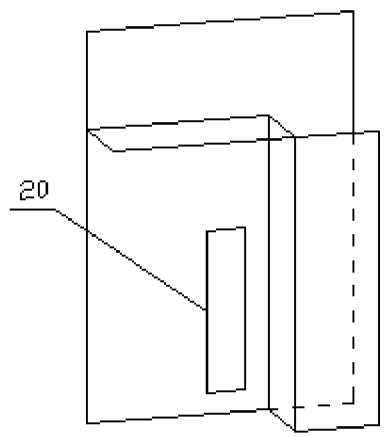
FIG. 6 is the perspective view (angle 1) of the first control separator 4, in which 20 is a rectangular liquid flow exit set on the side of the first control separator 4.
Figure 7:
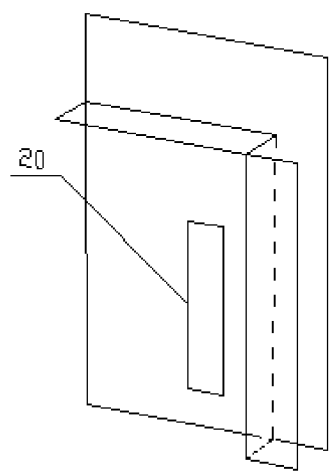
FIG. 7 is the perspective view (angle 2) of the first control separator 4, in which 20 is a rectangular liquid flow exit set on the side of the first control separator 4.
Figure 8:
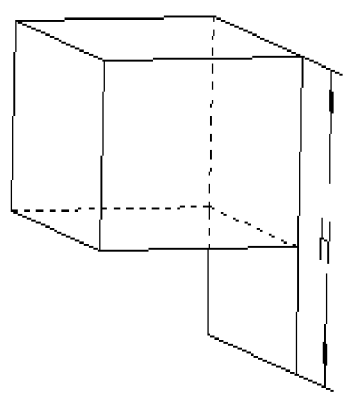
FIG. 8 is the perspective view of the second control separator 5, in which H is the height of the second control separator 5.

The method of using the apparatus of the present invention will be described with reference to the attached drawings.

The apparatus of the present invention comprises a three-phase-mixing chamber 1, a three-liquid-flow settler 2, and a two-phase-mixing chamber 3.

(1) When single-stage continuous extraction operation is conducted, the specific embodiments are as follows:

The two-phase mixture, which is flowed from the liquid flow exit 19 at the bottom of the overflow weir 18 in the two-phase-mixing chamber 3 of previous extraction-stage, flows through the first liquid flow entrance 7 connecting to the three-phase conflux compartment c into the three-phase conflux compartment c. The lightest top phase or the heaviest bottom phase of the three-phase system, which is flowed from the liquid flow exit 15 at the bottom of the three-phase liquid flow separator control compartment d in the three-liquid-flow settler 2 of previous extraction-stage, flows through the second liquid flow entrance 8 connecting to the three-phase mixing compartment a into the three-phase mixing compartment a. The liquid from the three-phase conflux compartment c and the liquid from the liquid flow entrance 8 are drew into the three-phase mixing compartment a by the self-pumping stirrer 6 in the three-phase mixing compartment a from the first diversion orifice 9 and the second diversion orifice 10 to be mixed thoroughly. The mixtures stay in the three-phase mixing compartment a for a certain period of time, overflow from the overflow weir 11 on the side of the three-phase overflow compartment b on the top of the three-phase-mixing chamber 1 that is close to the three-liquid-flow settler 2, then overflow from the interspace between the bottom of the vertical return-flow clap-board 12 on the side of the three-liquid-flow settler 2 that is close to the overflow weir 11 and the horizontal clap-board 13 below into the three-liquid-flow settler 2. The mixtures divide gradually into three macroscopic co-existed liquid phases in the three-liquid-flow settler 2, due to their gravitational density differences. The three-phase liquids are separated by the first control separator 4 or the second control separator 5 when flowing through the three-phase liquid flow separator control compartment d on the side of the three-liquid-flow settler 2 that is close to the two-phase-mixing chamber 3. The first control separator 4 is used when the lightest top phase of the three-phase liquid flows needs to be separated from the middle-bottom two-layered mixtures, and the second control separator 5 is used when the heaviest bottom phase of the three-phase liquid flows needs to be separated from the top-middle phase. When the first control separator 4 is used, the top phase can be educed out from the liquid flow exit 15 at the bottom of the three-phase liquid flow separator control compartment d on the top of the first control separator 4, while the middle-bottom two-layered mixtures can pass through the liquid flow exit 16 on side of the vertical clap-board from the liquid flow exit 20 on the side under the first control separator 4 into the two-phase-mixing chamber 3. When the second control separator 5 is used, the bottom phase can be educed out from the liquid flow exit 15 at the bottom of the three-phase liquid flow separator control compartment d under the second control separator 5, while the top-middle phase can pass through the liquid flow exit 16 on side of the vertical clap-board on the top of the second control separator 5 into the two-phase-mixing chamber 3. The two-phase mixtures flow through the return-flow clap-board 21 on the side of the vertical clap-board of the two-phase-mixing chamber 3 into the two-phase-mixing chamber 3, mix further by the stirrer 17, then flow out from the liquid flow exit 19 on the overflow weir 18 on the side of the two-phase-mixing chamber 3.

Figure 9:
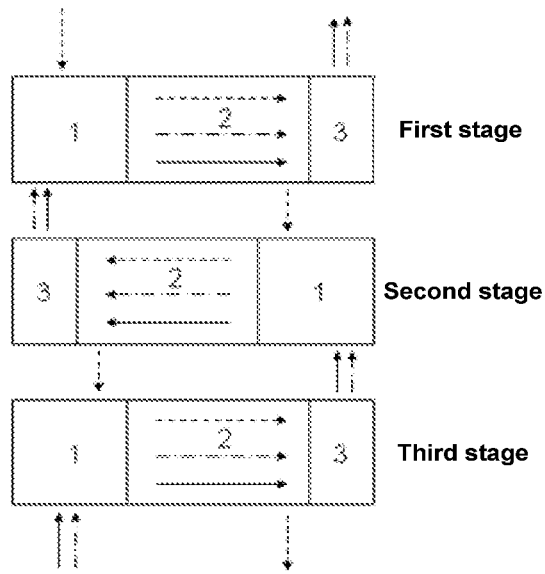
FIG. 9 is the schematic diagram of the three-phase liquid flow direction of a three-stage series-wound extraction apparatus.

(2) The multi-stage series-wound of the apparatus of the present invention realizes the continuous extraction operations of mutual countercurrent mass transfer of the top, the middle, and the bottom flows in the three-phase system, the embodiments of which can be described with reference to FIG. 9.

Taking two groups of three-stage series-wound operations as an example, the embodiment of Group 1 conducts the countercurrent operation mode of the middle-bottom two-layered mixtures with the top phase in the three-phase system, and the three-phase liquid flow control separator 4 is installed in the three-phase liquid flow separator control compartment d in the three-liquid-flow settler 2.

Top Phase Flow Direction:

The top phase flows into the three-phase-mixing chamber 1 of first stage extraction apparatus of Group 1, mixes thoroughly with the two-layered mixtures from the two-phase-mixing chamber 3 of the second stage extraction apparatus in the three-phase-mixing chamber 1, and then flows into the three-liquid-flow settler 2. The top phase separates with the middle-bottom two-layered mixtures of the three-phase system in the three-liquid-flow settler 2 because of the gravity. After phase separation, the top phase separates from the middle-bottom two-layered mixtures by the first control separator 4 in the three-phase liquid flow separator control compartment d, flows out from the liquid flow exit 15 at the bottom of the first control separator 4 into the three-phase-mixing chamber 1 of the second stage extraction apparatus. The process is repeated as above and finally the top phase flows out from the liquid flow exit 15 at the bottom of the three-phase liquid flow separator control compartment d in the three-liquid-flow settler 2 of the third stage extraction apparatus.

Middle-Bottom Two-Layered Mixtures Flow Direction:

The middle-bottom two-layered mixtures flow into the three-phase-mixing chamber 1 of third stage extraction apparatus of Group 1, mix thoroughly with the top phase separated by the three-phase liquid flow control separator 4 from the three-liquid-flow settler 2 of the second stage extraction apparatus in the three-phase-mixing chamber 1, and then flow into the three-liquid-flow settler 2. After phase separation with the top phase of the three-phase system in the three-liquid-flow settler 2 because of the gravity, the middle-bottom two-layered mixtures flow through the liquid flow exit 20 on the side under the three-phase liquid flow control separator 4, the liquid flow exit 16 on side of the vertical clap-board of the two-phase-mixing chamber 3, and the return-flow clap-board 21 into the two-phase-mixing chamber 3, thus separating from the top phase of the three-phase system. After further mixing, the middle-bottom two-layered mixtures flowing in the two-phase-mixing chamber 3 then flow out from the liquid flow exit 19 at the bottom of the overflow weir 18 in the two-phase-mixing chamber 3 into the three-phase-mixing chamber 1 of the second stage extraction apparatus. The process is repeated as above and finally the middle-bottom two-layered mixtures flow out from the liquid flow exit 19 at the bottom of the overflow weir 18 in the two-phase-mixing chamber 3 of the first stage extraction apparatus.

The middle-bottom two-layered mixtures from three-stage series-wound extraction apparatus of Group 1 are further divided into a middle phase and a bottom phase, which flow respectively into the first stage and the third stage of three-stage series-wound extraction apparatus of Group 2.

The embodiment of Group 2 conducts the countercurrent operation mode of the top-middle two-layered mixtures with the bottom phase in the three-phase system, and the three-phase liquid flow control separator 5 is installed in the three-phase liquid flow separator control compartment d in the three-liquid-flow settler 2.

Top-Middle Two-Layered Mixtures Flow Direction:

The middle phase from first stage apparatus of Group 1 mixes with the top phase from third stage apparatus of Group 1, and then flow into the three-phase-mixing chamber 1 of first stage extraction apparatus of Group 2. The middle-bottom two-layered mixtures mix thoroughly with the bottom phase separated by the three-phase liquid flow control separator 5 from the three-liquid-flow settler 2 of second stage extraction apparatus of Group 2 in the three-phase-mixing chamber 1, and then flow into the three-liquid-flow settler 2. After phase separation with the bottom phase of the three-phase system in the three-liquid-flow settler 2 because of the gravity, the top-middle two-layered mixtures separate with the bottom phase of the three-phase system when flowing through the liquid flow exit 16 on side of the vertical clap-board on the top of the three-phase liquid flow control separator 5 into the two-phase-mixing chamber 3. After further mixing, the middle-bottom two-layered mixtures then flow out from the liquid flow exit 19 at the bottom of the overflow weir 18 in the two-phase-mixing chamber 3 into the three-phase-mixing chamber 1 of the second stage extraction apparatus. The process is repeated as above and finally the middle-bottom two-layered mixtures flow out from the liquid flow exit 19 at the bottom of the overflow weir 18 in the two-phase-mixing chamber 3 of the third stage extraction apparatus.

Bottom Phase Flow Direction:

The bottom phase separating from first stage apparatus of Group 1 flows into the three-phase-mixing chamber 1 of third stage apparatus of Group 2 mixes thoroughly with the top-bottom two-layered mixtures from the two-phase-mixing chamber 3 of second stage apparatus of Group 2 in the three-phase-mixing chamber 1, and then flows into the three-liquid-flow settler 2. The bottom phase separates with the top-middle two-layered mixtures of the three-phase system in the three-liquid-flow settler 2 because of the gravity. After phase separation, the bottom phase separates from the top-middle two-layered mixtures by the three-phase liquid flow control separator 5, flows out from the liquid flow exit 15 at the bottom of the control separator 5 into the three-phase-mixing chamber 1 of second stage extraction apparatus of Group 2. The process is repeated as above and finally the bottom phase flows out from the liquid flow exit 15 at the bottom of the three-phase liquid flow control separator 5 in the three-liquid-flow settler 2 of first stage extraction apparatus of Group 2.

The top-middle two-layered mixtures from three-stage series-wound extraction apparatus of Group 2 are further divided into a top phase and a middle phase, which flow respectively into the first stage and third stage of three-stage series-wound extraction apparatus of Group 1.

The above combination of two groups of three-stage series-wound extraction apparatus realizes the continuous extraction operations of mutual countercurrent mass transfer among the top, the middle, and the bottom flows in the three-phase extraction system.

Example 1

Liquid-Liquid-Liquid Three-Phase Extraction and Separation of Pt, Pd and Rh

The apparatus of the present invention was applied to investigate the effects of one-step extraction and simultaneous three-phase separation of Pt, Pd and Rh in the three-liquid-phase system composed of diisopentyl sulfide-polyethylene glycol-ammonium sulfate-hydrochloric acid aqueous solution of Pt, Pd and Rh three-metal mixtures. The experiment was conducted on Pt, Pd and Rh mixed aqueous solution (Pt, Pd and Rh exist in hydrochloric acid aqueous solutions respectively in the form of aqueous $PtCl_6^{2-}$, $PdCl_4^{2-}$ and $RhCl_6^{3-}$ ions. The initial total concentrations of Pt, Pd and Rh are 0.52 mmol/L, 0.94 mmol/L and 0.97 mmol/L, respectively). After two groups of three-stage continuous and countercurrent three-phase extraction, the contents of Pt, Pd and Rh were analyzed and determined in the diisopentyl sulfide organic top phase, the polyethylene glycol polymer middle phase, and the ammonium sulfate aqueous bottom phase, respectively, obtained after separation by the three-phase liquid flow control separator 4 or 5. The results indicated that the top phase is Pd enriched with a Pd extraction rate of 98.0%, while Pt and Rh are not extracted; the middle phase is Pt enriched with a Pt extraction rate of 90.5%, while the contents of Pd and Rh are very low; the bottom phase is Rh enriched with a Rh enrichment rate of 98.2%, and Rh is not extracted.

Example 2

Liquid-Liquid-Liquid Three-Phase Extraction and Separation of Ti, Fe and Mg

The apparatus of the present invention was applied to investigate the effects of one-step extraction and simultaneous three-phase separation of Ti, Fe and Mg in the three-liquid-phase system composed of P204 (diisooctyl phosphate)-polyethylene glycol-ammonium sulfate-Ti, Fe and Mg mixed aqueous solution. The experiment was conducted on Ti, Fe and Mg mixed aqueous solution from Panzhihua, Sichuan, China (Ti, Fe and Mg exist in aqueous solution of pH=2 as the form of aqueous $Ti^{4+}$, $Fe^{3+}$ and $Mg^{2+}$ ions, respectively. The initial total concentrations of Ti, Fe and Mg are 30 mmol/L, 5 mmol/L, and 15 mmol/L, respectively). After two groups of three-stage continuous and countercurrent three-phase extraction, the contents of Ti, Fe and Mg were analyzed and determined in the P204 organic top phase, the polyethylene glycol polymer middle phase, and the ammonium sulfate aqueous bottom phase, respectively, obtained after separation by the three-phase liquid flow control separator 4 or 5. The top phase is Ti enriched with a Ti extraction rate of 99.0%, while Fe and Mg are not extracted; the middle phase is Fe enriched with an Fe extraction rate of 92.0%, while the contents of Ti and Mg are very low; the bottom phase is Mg enriched with a Mg enrichment rate of 99.0%, and Mg is not extracted.

Example 3

Liquid-Liquid-Liquid Three-Phase Extraction and Separation of O-Nitrophenol and P-Nitrophenol Binary Mixture Solution The apparatus of the present invention was applied to investigate the effects of one-step extraction and simultaneous three-phase separation of o-nitrophenol and p-nitrophenol in the three-liquid-phase system composed of nonane-polyethylene glycol-ammonium sulfate-o-nitrophenol and p-nitrophenol binary mixture aqueous solution. The experiment was conducted on o-nitrophenol and p-nitrophenol binary mixture aqueous solution (the initial concentrations of o-nitrophenol and p-nitrophenol are both 7.19 mmol/L). After two groups of three-stage continuous and countercurrent three-phase extraction, the contents of o-nitrophenol and p-nitrophenol were analyzed and determined in the nonane organic top phase, the polyethylene glycol polymer middle phase, and the ammonium sulfate aqueous bottom phase, respectively, obtained after separation by the three-phase liquid flow control separator 4 or 5. The results indicated that the top phase is o-nitrophenol enriched with an extraction rate of 98.0%, while p-nitrophenol is not extracted; the middle phase is p-nitrophenol enriched with an extraction rate of 93.0%, while the content of o-nitrophenol is less than 1%.

The invention claimed is:

1. An extraction system for liquid-liquid-liquid three phase continuous and countercurrent extraction, comprising a three-phase-mixing chamber, a three-liquid-flow settler, and a two-phase-mixing chamber, characterized in that:

the three-phase-mixing chamber (1) comprising a three-phase mixing compartment (a), a three-phase overflow compartment (b), and a three-phase conflux compartment (c), wherein clap-boards installed between the three-phase mixing compartment (a) and the three-phase overflow compartment (b), and between the three-phase mixing compartment (a) and the three-phase conflux compartment (c); the three-phase mixing compartment (a) comprising a self-pumping stirrer (6) connected with a speed continuously adjustable stirring motor through a stirring shaft; independent first liquid flow entrance (7) and second liquid flow entrance (8) mounted at the lower parts of the two sides of the three-phase conflux compartment (c), in which the first liquid flow entrance (7) is directly connected with the three-phase conflux compartment (c), while the second liquid flow entrance (8) is connected with the three-phase mixing compartment (a) through a pipe; on the central of the clap-board between three-phase mixing compartment (a) and three-phase conflux compartment (c), independent first diversion orifice (9) and second diversion orifice (10) are connected with three-phase conflux compartment (c) and the second flow entrance (8), respectively; on the side of three-phase overflow compartment (b) on the top of the three-phase-mixing chamber (1) and close to the three-liquid-flow settler (2), an overflow weir (11) connected with the three-liquid-flow settler (2);

a vertical return-flow clap-board (12) parallel to the vertical clap-board of the three-phase-mixing chamber (1) installed on the side of the three-liquid-flow settler (2) that is close to the overflow weir (11); a horizontal clap-board (13) perpendicular to the vertical return-flow clap-board connected to the vertical clap-board of the three-phase mixing chamber below the vertical return-flow clap-board; an interspace between the bottom of the vertical return-flow clap-board (12) and the horizontal clap-board (13) under the vertical return-flow clap-board (12);

on the side of the three-liquid-flow settler (2) that is close to the two-phase-mixing chamber (3), a three-phase liquid flow separator control compartment (d) in which two different types in need of pluggable three-phase liquid flow first control separator (4) or second control separator (5) installed and fastened by a localizer (14); a liquid flow exit (15) being at the bottom of three-phase liquid flow separator control compartment (d) on the bottom side of the vertical clap-board of the three-liquid-flow settler (2), and a rectangular liquid flow exit (16) installed on the side of the vertical clap-board of the two-phase-mixing chamber (3) close to the three-phase liquid flow separator control compartment (d); the first control separator (4) being used when the lightest top phase of the three-phase liquid flows needs to be separated from the middle-bottom two-layered mixtures, and the a rectangular liquid flow exit (20) being installed with the same height and width as that of the exit (16) on the side under the first control separator (4); the second control separator (5) being used when the heaviest bottom phase of the three-phase liquid flows needs to be separated from the top-middle phase, and no exit on the side of the second control separator (5), the height H of the second control separator (5) being half of the height L of the exit (16); when first control separator (4) being used, the top phase educed out from the liquid flow exit (15) at the bottom of the three-phase liquid flow separator control compartment (d) on the top of the first control separator (4), while the middle-bottom two-layered mixtures passing through the liquid flow exit (16) on side of the vertical clap-board from the liquid flow exit (20) on the side under the first control separator (4) into the two-phase-mixing chamber (3); when second control separator (5) being used, the bottom phase educed out from the liquid flow exit (15) at the bottom of the three-phase liquid flow separator control compartment (d) under the second control separator (5), while the top-middle phase passing through the liquid flow exit (16) on side of the vertical clap-board on the top of the second control separator (5) into the two-phase-mixing chamber (3);

a stirrer (17) connected with a speed continuously adjustable stirring motor through a stirring shaft in two-phase-mixing chamber (3); an overflow weir (18) on the side of the two-phase-mixing chamber (3); the height of the overflow weir (18) reaching at the middle of the two-phase-mixing chamber (3); a liquid flow exit (19) being below the overflow weir (18);

a return-flow clap-board (21) parallel to the vertical clap-board with the same width and length as that of the rectangular liquid flow exit (16) installed on the side of the two-phase-mixing chamber (3) that is close to the three-phase liquid flow separator control compartment (d) in the three-liquid-flow settler (2), at the liquid flow exit (16) on side of the vertical clap-board of the two-phase-mixing chamber (3), an interspace being between the return-flow clap-board (21) and liquid flow exit (16);

wherein the ratio of length of three-phase-mixing chamber (1), three-liquid-flow settler (2), and two-phase-mixing chamber (3) is 1:5:1; and the ratio of volume of the three chambers is also 1:5:1 when their widths and heights are the same.

\* \* \* \* \*